United States Patent
Iredi

(10) Patent No.: US 9,539,738 B2
(45) Date of Patent: *Jan. 10, 2017

(54) WOOD MATERIAL BOARD HOT-PRESSING DEVICE AND OPERATION PROCESS FOR SUCH A DEVICE

(71) Applicant: Kronotec AG, Lucerne (CH)

(72) Inventor: Matthias Iredi, Hergiswil (CH)

(73) Assignee: SWISS KRONO TEC AG, Lucerne (CH)

( * ) Notice: Subject to any disclaimer, the term of this patent is extended or adjusted under 35 U.S.C. 154(b) by 370 days.

This patent is subject to a terminal disclaimer.

(21) Appl. No.: 14/150,148

(22) Filed: Jan. 8, 2014

(65) Prior Publication Data

US 2014/0216628 A1 Aug. 7, 2014

(30) Foreign Application Priority Data

Feb. 1, 2013 (EP) ..................................... 13000538

(51) Int. Cl.
  *B27N 3/06* (2006.01)
  *B30B 15/34* (2006.01)
  (Continued)

(52) U.S. Cl.
  CPC .............. *B27N 3/06* (2013.01); *B29C 35/0288* (2013.01); *B30B 15/34* (2013.01); *B29C 35/04* (2013.01)

(58) Field of Classification Search
  CPC ....... B27N 3/06; B27N 3/203; B29C 35/0288; B29C 25/04; B29C 66/72379; B29C 66/7487; B29C 2035/043; B30B 15/34
  (Continued)

(56) References Cited

U.S. PATENT DOCUMENTS 6,126,883 A * 10/2000 Troetscher ............... B27N 7/00
                                                264/109
6,367,304 B1 * 4/2002 Fahrenbach ............... B21J 9/02
                                                72/342.2
(Continued)

FOREIGN PATENT DOCUMENTS

JP        6309400 A  * 12/1988
JP       63309400 A    12/1988
(Continued)

OTHER PUBLICATIONS

Translation of JP 5171957 B2, published Jan. 2013.*

*Primary Examiner* — George Koch
(74) *Attorney, Agent, or Firm* — Andrew M. Calderon; Roberts Mlotkowski Safran Cole & Calderon, P.C.

(57) ABSTRACT

A wood material board hot-pressing system with a primary circuit includes a supply pipe for discharging of hot heat transfer fluid from a heat generator and a return pipe for supplying cooled heat transfer fluid to the heat generator. A secondary circuit features a pressing device for pressing wood material boards. A supply channel supplies heat transfer fluid to the pressing device and a return channel returns cooled heat transfer fluid to the primary circuit. A controlling device contains a control valve and is configured to control a flow of heat transfer fluid from the primary circuit to the secondary circuit. A secondary circulation pump with variable output is set up to circulate the heat transfer fluid in the secondary circuit. The controlling device features a heat output recording device and is configured to automatically control a level of heat output (P) supplied to the pressing device.

16 Claims, 1 Drawing Sheet

(51) Int. Cl.
*B29C 35/02* (2006.01)
*B29C 35/04* (2006.01)

(58) Field of Classification Search
USPC .......................................... 156/62.2, 64, 359
See application file for complete search history.

(56) References Cited

U.S. PATENT DOCUMENTS

2003/0094739 A1* 5/2003 Isobe ................... B30B 15/064
    264/663
2003/0136280 A1* 7/2003 Husted ................... B27N 3/203
    100/92

FOREIGN PATENT DOCUMENTS

| | | | | |
|---|---|---|---|---|
| JP | 2001353741 A | * | 12/2001 | |
| JP | 2001353741 A | | 12/2001 | |
| JP | 2008111665 A | * | 5/2008 | |
| JP | 2008111665 A | | 5/2008 | |
| JP | WO 2010024220 A1 | * | 3/2010 | ........... B30B 15/064 |
| JP | 5171957 B2 | * | 3/2013 | |
| WO | WO-2010024220 A1 | | 3/2010 | |

* cited by examiner

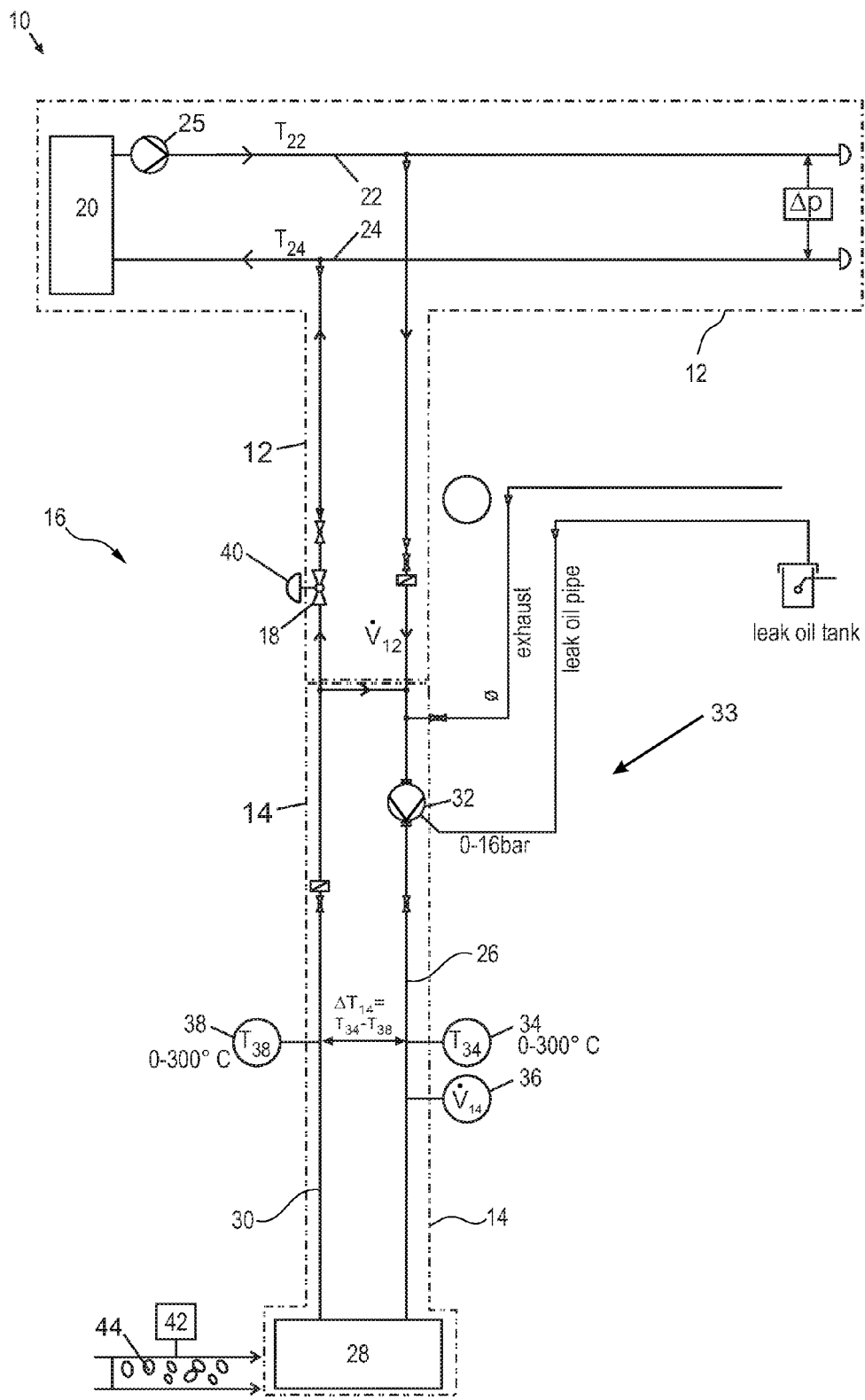

WOOD MATERIAL BOARD HOT-PRESSING DEVICE AND OPERATION PROCESS FOR SUCH A DEVICE

BACKGROUND OF THE INVENTION

1. Field of the Invention

The invention refers to a wood material board hot-pressing device with (a) a primary circuit, which features a supply pipe for the discharging of hot heat transfer fluid from a heat generator and a return pipe for the supplying of cooled heat transfer fluid to the heat generator, (b) a secondary circuit, which features a pressing device for the compression of wood material boards, a supply channel for the supplying of heat transfer fluid to the pressing device and a return channel for the returning of cooled hear transfer fluid to the primary circuit, and (c) a controlling device which contains a control valve and is configured to control a flow of heat transfer fluid from the primary circuit to the secondary circuit, specifically from the supply pipe to the supply channel.

According to a second aspect, the invention refers to the operation process for such a wood material board hot-pressing device.

2. Discussion of Background Information

Such wood material board hot-pressing devices are used in order to produce by means of compression a wood material board from dried wood particles mixed with a glue. Such hot-pressing devices are set up to run continuously, i.e. they are continuously loaded with wood particles mixed with glue and produce a continuous flow of wood material boards.

Usually, wood material board hot-pressing devices are stopped only if a defect is present or if the device is to be readjusted to facilitate the production of wood material boards with different dimensions. With each restart there is a warm-up period in which no usable product is produced, only waste. If the pressing device is frequently restarted, this can thus lead to a substantial amount of waste.

SUMMARY

The invention has the purpose of improving the productivity of a wood material board hot-pressing system.

The invention solves the problem by means of a wood material board hot-pressing device, which features a variable-output secondary circulation pump, which is set up to circulate the heat transfer fluid in the secondary circuit, wherein the controlling device features a heat output recording device, which chiefly comprises a volumetric flow gauge for the recording of the volumetric flow of heat transfer fluid in the secondary circuit, an inlet temperature gauge for the measuring of the inlet temperature of the heat transfer agent which flows to the pressing device in the secondary circuit, and a return temperature gauge for the measuring of the return temperature of the heat transfer agent, which flows back from the pressing device in the secondary circuit, and which is configured to automatically regulate a level of heat output to be supplied to the pressing device. Specifically, the regulating is enabled through reference to the volumetric flow and the temperature difference between inlet temperature and return temperature.

According to a second aspect, the invention solves the problem by means of a method which comprises the step of regulating or controlling the heat output to be supplied to the pressing device. Specifically, this regulation or control is enabled by means of altering the flow of heat transfer fluid from the primary circuit to the secondary circuit and through reference to the volumetric flow and the temperature difference between the inlet temperature and the return temperature.

The flow of heat transfer fluid, which is usually a thermal oil, has hitherto been regulated exclusively through the temperature, for example of the returning fluid. If the heat requirement of the pressing device changes, for example because the wood material to be pressed contains a higher water content, it then follows that the temperature of the thermal oil drops. This is countered by an increased supply of hot thermal oil. A disadvantage of this is that the regulation always functions on a reactive basis. Whereas, by means of the solution provided by the invention, it is possible to pre-emptively increase the heat output if an increased demand for heat output is expected.

For example, should the pressing device be restarted after a readjustment or after an incident, then the demand for heat output is increased, until the temperature of the pressing plate of the pressing device is at the correct level. With conventional systems, the adjustment of the temperature takes a relatively long time, as the secondary circuit contains a considerable amount of thermal inertia due to the large quantity of heat transfer fluid. As such, with conventional systems the temperature and therefore the heat output rise continuously until the stationary state is reached.

However, if the heat output is regulated, as provided for by the invention, then the temperature of the pressing device increases very quickly from the beginning. As a result, the stationary condition can be reached in a clearly faster manner. Overall, waste thus decreases.

In order to increase heat output, the inlet temperature can be increased and/or the volumetric flow to the pressing device amplified. Provided the maximum permissible inlet temperature is not exceeded and/or the maximum permissible temperature difference is not exceeded, it is more beneficial to further open the control valve and thus to increase the heat output. In this way a secondary circulation pump in the secondary circuit can be operated using electrical power, which is always close to the level of power that is indispensable for the provision of heat output. If the temperature cannot be further increased, because either one of the two limits specified above is exceeded or the regulating valve is fully open, the output volume of the primary circulation pump in the primary circuit is increased.

If the amount of heat cannot be changed, naturally no regulatory intervention is accomplished.

The controlling device is chiefly set up to automatically record whether the temperature difference has exceeded a given maximum value and, if this is the case, to reduce the degree to which the control valve is open.

The wood material board hot-pressing device preferably contains a moisture gauge which is programmed to measure water content in the wood material that is brought into the pressing device, wherein the controlling device is connected to the moisture gauge and set up to automatically alter the heat output according to the water content. A high water content in the wood board material requires an increased heat output so that the residual moisture remains constant in the finished wood board material. Because the heat output is regulated, the exact amount of heat is brought into the resulting wood material board that is necessary to achieve a given level of residual moisture in the finished wood material board. Using temperature management, according to the present state of the art, the thermal inertia of the secondary circuit is such that the residual moisture in the finished wood material board can be varied.

The primary circuit importantly has an output-variable, in particular a speed-controlled, primary circulation pump and a differential pressure sensor, by means of which the primary pressure difference between the initial pressure of the heat transfer fluid in the primary supply pipe and the return pressure of the heat transfer fluid in the primary return pipe can be calculated, wherein the primary circulation pump is set up to regulate the output according to a target primary pressure difference. This guarantees that, with continuous positioning of the control valve, the same quantity of heat transfer fluid always crosses from the primary circuit the secondary circuit. This facilitates the controlling of heat output in the pressing device.

It is particularly advantageous when the controlling device is programmed to automatically increase the target primary pressure difference if the control valve is in the maximum position and the heat output is to be increased. In particular the controlling device is programmed to automatically increase the target primary pressure difference if the control valve is in the maximum position and the heat output is to be increased.

The invention additionally solves the problem by way of a wood material board hot-pressing device, in which the control valve is a two-way control valve which includes a position indicator. This makes a restart after shutting down the pressing device easier, given that immediately after resuming operation exactly the amount of heat is brought into the pressing device which is necessary to produce the wood material board.

It is advantageous when the two-way control valve is a pneumatic two-way control valve with an electro-pneumatic control element. A control valve of this type can be operated particularly quickly, such that the initial adjustment time becomes particularly small.

According to the invention, the method is best accomplished in such a way that the driving power of the primary circulation pump and/or the secondary circulation pump is/are minimised. This can take place particularly effectively on the condition that a maximum temperature difference between inlet and return temperature in the secondary circuit may not be exceeded and that the inlet temperature in the secondary circuit may not exceed a given maximum temperature. Here it is beneficial if the wood material board hot-pressing device can be operated particularly economically when partially loaded.

According to the invention, the method preferably includes the steps for altering the pressing device such that a wood material board with an altered thickness and/or an altered width can be produced, for determining the position of the control valve which corresponds to thickness and/or width, for pre-setting the control valve to the said determined position and for restarting the pressing device. In other words, when the pressing device is restarted, the control valve is directly set to the position required for the press device to be supplied with at least the heat output necessary for the continuous operation of the pressing device for the given thickness and width. It is particularly advantageous for the control valve to be adjusted to a position which corresponds to a level of heat output which is larger than the heat output needed for the continuous operation of the pressing device with the given thickness and width. The pressing device is thus heated up quickly and as such the desired product quality is quickly obtained. This reduces the processing time factor.

The determining of the position of the control valve can include, for example, a selection and/or an interpolating of a characteristic diagram. In this characteristic diagram the potential dimensions of the wood material board to be produced are collated with the levels of heat output or positions of the control valve which are necessary for the production of the wood material board.

Preferably, for every dimension of the wood material board being manufactured, the water content of the wood material board which is supplied to the pressing device will also be saved. In other words, the position of the control valve and thus the heat output is selected depending on the dimensions of the wood material board to be produced and the residual moisture of the wood material from which the wood material board will be pressed.

The primary pressure difference is best increased by increasing the output of the primary circulation pump, if the control valve has reached its maximum position. The output of the primary circulation pump is preferably increased if the control valve has reached its maximum position, and the heat output supplied to the secondary circuit by the primary circuit is smaller than the necessary heat output. Through these measures the control valve returns to the control range.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

The FIGURE shows the wood material board hot-pressing device and processes thereof according to the invention.

DETAILED DESCRIPTION OF THE INVENTION

The FIGURE shows a wood material board hot-pressing device 10, which features a primary circuit 12, a secondary circuit 14 and a controlling device 16, which comprises one control valve 18.

The primary circuit 12 has a heat generator 20 in the form of a boiler system, a supply pipe 22 for the discharging of heated heat transfer fluid from the heat generator 20 and a return pipe 24, through which cooled down heat transfer fluid, consisting of a thermal oil, flows back. The primary circuit 12 includes a primary circulation pump 25, which is set up to adjust the pressure difference p between the supply pipe 22 and the return pipe the 24. In addition the primary circuit 12 has a differential pressure sensor 27.

The secondary circuit 14 includes a supply channel 26 for supplying thermal oil to the pressing device 28 and a return channel 30, through which the thermal oil coming from the pressing device 28 flows back.

The secondary circuit 14 additionally includes a secondary circulation pump 32, by means of which the thermal oil is circulated, and a heat output recording device 33, which includes an inlet temperature gauge 34, a volumetric flow gauge 36 and a return temperature gauge 38. By means of the temperature difference $\Delta T_{14}=T_{34}-T_{38}$ between the inlet temperature $T_{34}$ and return temperature $T_{38}$, the volumetric flow $\dot{V}_{14}$ as well as the specific thermal capacity and the density of the thermal oil, the heat output P supplied to the pressing device 28 can be calculated.

The controlling device 16 includes an electronic control system 40, which is electronically connected to the inlet temperature gauge 34, the volumetric flow gauge 36, the return temperature gauge 38 and the control valve 18 and is set up to automatically regulate the heat output P which is supplied to the pressing device 28. In addition the control valve 18 is controlled in such a way that the volumetric flow $\dot{V}_{12}$ adjusts itself to the level of heat transfer from the primary circuit 12 to the secondary circuit 14, which is so large that the heat output P is altered. Let it be noted that this applies in all cases $\dot{V}_{14} \neq \dot{V}_{12}$.

In addition, the electronic control system 14 is connected to a moisture gauge 42, which measures the water content w of the wood material 44 which is supplied to the pressing device 28 for pressing. The heat output P needed for pressing varies depending on the water content w. If a change in water content w is detected by the moisture gauge 42, then this adjusts the heat output P.

The control valve 18 is designed as a pneumatic control valve with an electro-pneumatic positioner and position feedback. Since the inlet temperature $T_{22}$ is approximately constant and the pressure difference $\Delta p$ is likewise kept constant in the range of the control valve 18, the position of the control valve approximately corresponds to the heat output P, which is transferred from the primary circuit 12 to the secondary circuit 14.

Should the format of the schematically drawn wood material board to be produced 46, which can be for example a medium-density fibreboard, a high-density fibreboard or an OSB board or a chipboard, be changed, a pressing plate is for example exchanged, with the aid of the heat from the thermal oil transferred to the compressed material. When restarting the pressing device 28, the control valve 18 is set to the position which results in the heat output P (x, z, w) being supplied to the pressing device 28 that is necessary for the production of a wood material board with the width x, the height z and the water content w of the wood material 44.

The heat output P (x, z, w) is selected, for example, from the digital memory of the electronic control system 40. As long as the format of the wood material board to be produced does not change, the position of the control valve 18 is noted and stored before the pressing device 28 is shut down. On restarting the pressing device 28, the control valve 18 is set to this position.

Smaller deviations from this position may be made, for example the control valve 18 can be slightly further opened, so that the heat output is initially larger than is actually necessary, such that the pressing device 28 reaches the correct temperature particularly quickly.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A wood material board hot-pressing device, comprising:
   a primary circuit, which comprises:
      a supply pipe which discharges hot heat transfer fluid from a heat generator; and
      a return pipe which supplies cooled heat transfer fluid to the heat generator;
   a secondary circuit, which comprises:
      a pressing device which presses wood material boards;
      a supply channel which supplies heat transfer fluid to the pressing device; and
      a return channel which returns the cooled heat transfer fluid to the primary circuit; and
   a controlling device, which comprises:
      a control valve; and
      is set up to regulate a flow of the heat transfer fluid from the primary circuit to the secondary circuit; and
   a variable output secondary circulation pump, which is set up to circulate the heat transfer fluid in the secondary circuit,
   wherein the controlling device comprises:
      a heat output recording device; and
      is configured to automatically regulate a level of heat output to be supplied to the pressing,
   wherein the controlling device is programmed to automatically increase a target primary pressure difference, if the control valve is in a maximum position and heat output is to be increased.

2. The wood material board hot-pressing device according to claim 1, further comprising a moisture gauge programmed to measure water content of the wood material boards which are brought into the pressing device, wherein the controlling device is connected to the moisture gauge and is set up to automatically alter heat output according to the water content.

3. The wood material board hot-pressing device according to claim 2, wherein the control valve of the controlling device is a two-way control valve which includes a position indicator which is set up to regulate a flow of the heat transfer fluid from the primary circuit to the secondary circuit.

4. The wood material board hot-pressing device according to claim 1, wherein the control valve of the controlling device is a two-way control valve which includes a position indicator which is set up to regulate a flow of the heat transfer fluid from the primary circuit to the secondary circuit.

5. A wood material board hot-pressing device, comprising:
   a primary circuit, which comprises:
      a supply pipe which discharges hot heat transfer fluid from a heat generator; and
      a return pipe which supplies cooled heat transfer fluid to the heat generator;
   a secondary circuit, which comprises:
      a pressing device which presses wood material boards;
      a supply channel which supplies heat transfer fluid to the pressing device; and
      a return channel which returns the cooled heat transfer fluid to the primary circuit; and
   a controlling device, which comprises:
      a control valve; and
      is set up to regulate a flow of the heat transfer fluid from the primary circuit to the secondary circuit; and
   a variable output secondary circulation pump, which is set up to circulate the heat transfer fluid in the secondary circuit,
   wherein the controlling device comprises:
      a heat output recording device; and
      is configured to automatically regulate a level of heat output to be supplied to the pressing device, and
   wherein:

the heat output recording device comprises:
a volumetric flow gauge which records volumetric flow of the heat transfer fluid through the secondary circuit;
an inlet temperature gauge which measures an inlet temperature of the heat transfer fluid which flows in the secondary circuit to the pressing device; and
a return temperature gauge which measures return temperature of the heat transfer fluid, which flows from the pressing device in the secondary circuit; and the controlling device is set up to automatically regulate heat output by reference to the volumetric flow and a temperature difference between the inlet temperature and the return temperature in the secondary circuit.

6. The wood material board hot-pressing device according to claim 5, wherein the controlling device is set up to automatically record whether the control valve has reached a maximum position; and
in the affirmative, to increase output of a primary circulation pump in the primary circuit; and
in the negative, to increase a degree to which the control valve is open if heat output is to be increased.

7. The wood material board hot-pressing device according claim 5, wherein the controlling device is set up to automatically record whether the temperature difference has exceeded a given maximum value and in the affirmative to reduce a degree to which the control valve is open.

8. A wood material board hot-pressing device, comprising:
a primary circuit, which comprises:
a supply pipe which discharges hot heat transfer fluid from a heat generator; and
a return pipe which supplies cooled heat transfer fluid to the heat generator;
a secondary circuit, which comprises:
a pressing device which presses wood material boards;
a supply channel which supplies heat transfer fluid to the pressing device; and
a return channel which returns the cooled heat transfer fluid to the primary circuit; and
a controlling device, which comprises:
a control valve; and
is set up to regulate a flow of the heat transfer fluid from the primary circuit to the secondary circuit; and
a variable output secondary circulation pump, which is set up to circulate the heat transfer fluid in the secondary circuit,
wherein the controlling device comprises:
a heat output recording device; and
is configured to automatically regulate a level of heat output to be supplied to the pressing device, and
wherein the primary circuit comprises:
a variable-output, comprising a speed-controlled, primary circulation pump; and
a differential pressure sensor, by which a primary pressure difference between an initial pressure of the heat transfer fluid in the supply pipe and the return pressure of the heat transfer fluid in the return pipe is calculated,
wherein the primary circulation pump in the primary circuit is set up to regulate the output according to a target primary pressure difference.

9. A wood material board hot-pressing device, comprising:
a primary circuit, which comprises:
a supply pipe which discharges hot heat transfer fluid from a heat generator; and
a return pipe which supplies cooled heat transfer fluid to the heat generator;
a secondary circuit, which comprises:
a pressing device which presses wood material boards;
a supply channel which supplies heat transfer fluid to the pressing device; and
a return channel which returns the cooled heat transfer fluid to the primary circuit; and
a controlling device, which comprises:
a control valve; and
is set up to regulate a flow of the heat transfer fluid from the primary circuit to the secondary circuit;
a variable output secondary circulation pump, which is set up to circulate the heat transfer fluid in the secondary circuit; and
a moisture gauge programmed to measure water content of the wood material boards which are brought into the pressing device, wherein the controlling device is connected to the moisture gauge and is set up to automatically alter heat output according to the water content,
wherein the controlling device comprises:
a heat output recording device;
is configured to automatically regulate a level of heat output to be supplied to the pressing device; and
is programmed to automatically increase the target primary pressure difference, if the control valve is in a maximum position and heat output is to be increased.

10. A wood material board hot-pressing device, comprising:
a primary circuit, which comprises:
a supply pipe for discharging hot heat transfer fluid from a heat generator; and
a return pipe for supplying cooled heat transfer fluid to the heat generator;
a secondary circuit, which comprises:
a pressing device which presses wood material boards;
a supply channel which the supplies heat transfer fluid to the pressing device; and
a return channel which returns of cooled heat transfer fluid to the primary circuit; and
a controlling device, which comprises:
a control valve and is set up to regulate a flow of the heat transfer fluid from the primary circuit to the secondary circuit,
wherein the control valve is a two-way control valve which includes a position indicator, and
the controlling device is programmed to automatically increase a target primary pressure difference, if the control valve is in a maximum position and heat output is to be increased.

11. A method for operation of a wood material board hot-pressing device comprising:
a primary circuit, which comprises:
a supply pipe for discharging hot heat transfer fluid from a heat generator; and
a return pipe for supplying cooled heat transfer fluid to the heat generator; and
a primary circulation pump for circulation of the heat transfer fluid;
a secondary circuit, which comprises:
a pressing device for compression of wood material boards;
a supply channel for supplying of the heat transfer fluid to the pressing device; and a return channel for returning of the cooled heat transfer fluid to the primary circuit; and a controlling device, which contains a control valve, the method comprising controlling heat output which is supplied to the pressing device by altering flow of the heat transfer fluid from the primary circuit to the secondary circuit through reference to volumetric flow and a temperature difference between an inlet temperature and return temperature in the secondary circuit.

12. The method according to claim 11, wherein regulation of the heat output is at least effected in such a way that power of at least one of the primary circulation pump and the secondary circulation pump is altered.

13. The method according to claim 11, further comprising:

increasing the heat output;

altering the pressing device so that the wood material board with at least one of an altered thickness and width can be produced;

determining a position of the control valve, which corresponds to at least one of the thickness and width;

pre-setting the control valve to the determined position; and restarting the pressing device.

14. The method according to claim 11, further comprising:

continuously recording water content in the wood material boards to be compressed;

determining heat output which corresponds to the water content; and adjusting the control valve, such that the heat output is adjusted.

15. The method according to claim 11, wherein a primary pressure difference is increased by increasing an output of the primary circulation pump if the control valve has reached a maximum position.

16. A wood material board hot-pressing device, comprising:

a primary circuit, which comprises:

a supply pipe for discharging hot heat transfer fluid from a heat generator; and a return pipe for supplying cooled heat transfer fluid to the heat generator;

a secondary circuit, which comprises:

a pressing device which presses wood material boards;

a supply channel which the supplies heat transfer fluid to the pressing device; and a return channel which returns of cooled heat transfer fluid to the primary circuit; and a controlling device, which comprises:

a control valve and is set up to regulate a flow of the heat transfer fluid from the primary circuit to the secondary circuit, wherein the control valve is a two-way control valve which includes a position indicator, and the controlling device controls heat output by altering flow of the heat transfer fluid from the primary circuit to the secondary circuit through reference to volumetric flow and a temperature difference between an inlet temperature and return temperature in the secondary circuit.

\* \* \* \* \*